US011401170B2

(12) United States Patent
Ohkoshi et al.

(10) Patent No.: US 11,401,170 B2
(45) Date of Patent: Aug. 2, 2022

(54) IRON BASED OXIDE MAGNETIC POWDER AND METHOD FOR PRODUCING SAME

(71) Applicants: DOWA ELECTRONICS MATERIALS CO., LTD., Tokyo (JP); THE UNIVERSITY OF TOKYO, Tokyo (JP)

(72) Inventors: Shin-ichi Ohkoshi, Tokyo (JP); Asuka Namai, Tokyo (JP); Kenji Sakane, Tokyo (JP); Tetsuya Kawahito, Tokyo (JP)

(73) Assignees: DOWA ELECTRONICS MATERIALS CO., LTD., Tokyo (JP); THE UNIVERSITY OF TOKYO, Tokyo (JP)

( * ) Notice: Subject to any disclaimer, the term of this patent is extended or adjusted under 35 U.S.C. 154(b) by 0 days.

(21) Appl. No.: 16/979,241

(22) PCT Filed: Mar. 26, 2019

(86) PCT No.: PCT/JP2019/013048
§ 371 (c)(1),
(2) Date: Sep. 9, 2020

(87) PCT Pub. No.: WO2019/189282
PCT Pub. Date: Oct. 3, 2019

(65) Prior Publication Data
US 2021/0300779 A1 Sep. 30, 2021

(30) Foreign Application Priority Data
Mar. 29, 2018 (JP) .............................. JP2018-064856

(51) Int. Cl.
*C01G 49/06* (2006.01)
*H01F 1/11* (2006.01)
(Continued)

(52) U.S. Cl.
CPC .............. *C01G 49/06* (2013.01); *H01F 1/11* (2013.01); *B82Y 30/00* (2013.01); *B82Y 40/00* (2013.01);
(Continued)

(58) Field of Classification Search
CPC .. C01G 49/06; G11B 5/70642; C01P 2006/42
See application file for complete search history.

(56) References Cited

FOREIGN PATENT DOCUMENTS

| JP | 2008-063199 | 3/2008 |
|----|-------------|--------|
| JP | 2008-063201 | 3/2008 |

(Continued)

OTHER PUBLICATIONS

S. Ohkoshi et al., "Nanometer-size hard magnetic . . . optical-magnetoelectric effect", Scientific Reports, 5, 14414/1-9 (2015).
(Continued)

*Primary Examiner* — Alexandre F Ferre
(74) *Attorney, Agent, or Firm* — Clark & Brody LLP

(57) ABSTRACT

[Problem] To provide a method for producing iron based oxide magnetic powder that has a narrow particle size distribution and a small content of fine particles that do not contribute to the magnetic recording characteristics, and consequently has a narrow coercive force distribution and is suitable for the enhancement of the recording density of the magnetic recording medium. [Solution] ε-Type iron based oxide magnetic powder is obtained by a wet method, then a tetraalkylammonium salt as a surface modifier is added to a slurry containing the magnetic powder to make a concentration of 0.009 mol/kg or more and 1.0 mol/kg or less, and simultaneously to make pH of 11 or more and 14 or less, and the slurry is subjected to a dispersion treatment and then classified, so as to provide iron based oxide magnetic powder having a narrow particle size distribution and a narrow coercive force distribution.

11 Claims, 2 Drawing Sheets

(51) Int. Cl.
  *B82Y 30/00* (2011.01)
  *B82Y 40/00* (2011.01)

(52) U.S. Cl.
  CPC ...... *C01P 2004/04* (2013.01); *C01P 2004/64* (2013.01); *C01P 2006/40* (2013.01); *C01P 2006/42* (2013.01)

(56) References Cited

FOREIGN PATENT DOCUMENTS

| | | |
|---|---|---|
| JP | 2008-174405 | 7/2008 |
| JP | 2016-135737 | 7/2016 |
| JP | 2016-174135 | 9/2016 |
| JP | 2017-001944 | 1/2017 |
| JP | 2017-024981 | 2/2017 |
| WO | 2008/029861 | 3/2008 |
| WO | 2008/149785 | 12/2008 |
| WO | WO-2016047559 A1 * | 3/2016 ............ G11B 5/706 |
| WO | WO-2016199937 A1 * | 12/2016 ............ C01G 49/00 |
| WO | 2018/088050 | 5/2018 |

OTHER PUBLICATIONS

S. Sakurai et al., "First Observation of . . . All Four $Fe_2O_3$ Phases ($\gamma \to \varepsilon \to \beta \to \alpha$-Phase)", J. Am. Chem. Soc., 131, 18299-18303 (2009).

A. Namai et al., "Synthesis of an Electromagnetic . . . High-Speed Wireless Communication", J. Am. Chem. Soc., 131, 1170-1173 (2009)

A. Namai et al., "Hard magnetic ferrite . . . millimetre wave rotation", Nature Communications, 3, 1035/1-6 (2012).

S. Ohkoshi et al., "A millimeter-Wave Absorber . . . Oxide Nanomagnets", Angew. Chem. Int. Ed., 46, 8392-8395 (2007).

S. Ohkoshi et al., "Multimetal-Substituted Epsilon-Iron . . . Tape in the Big-Data Era", Angew. Chem. Int. Ed., 55, 11403-11406 (2016).

* cited by examiner

[Fig.1]
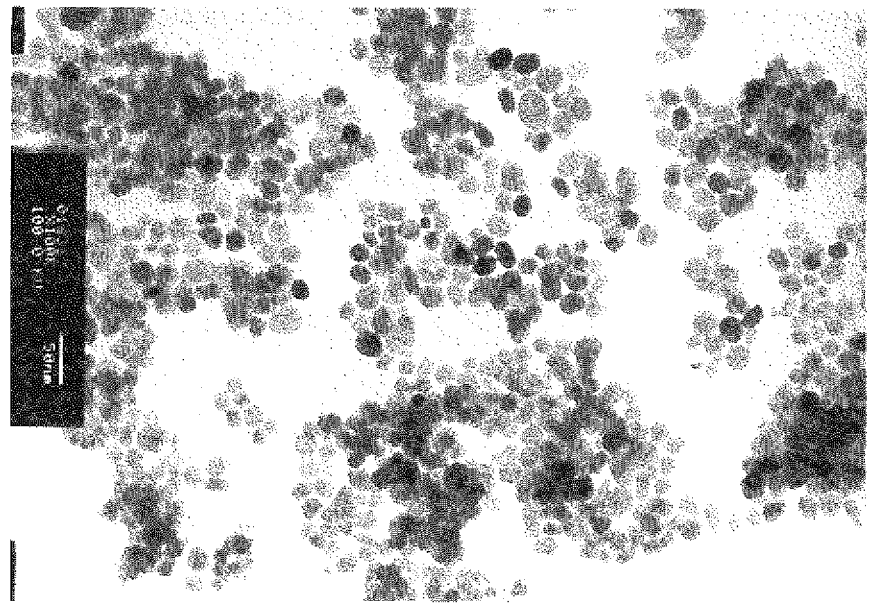
[Fig.2]
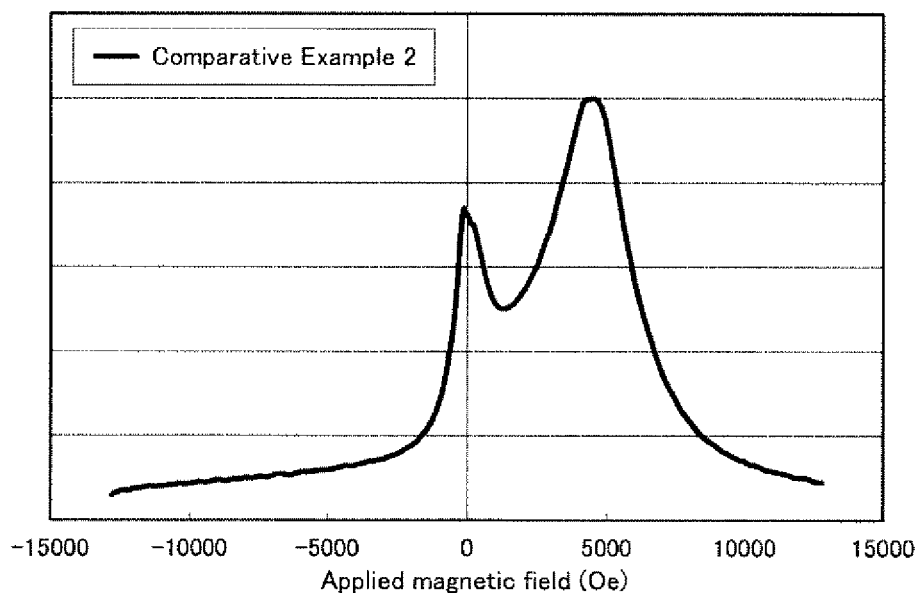

[Fig.3]
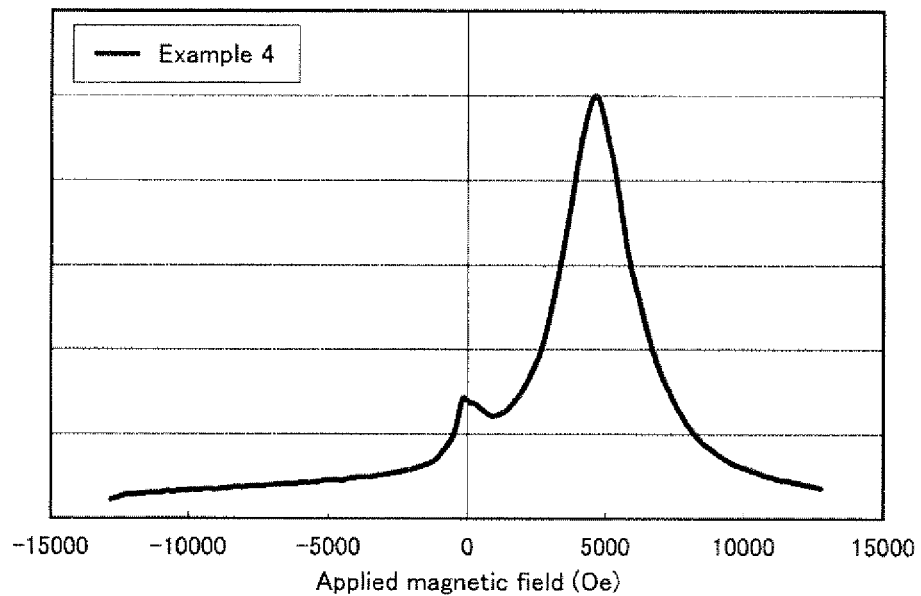
[Fig.4]
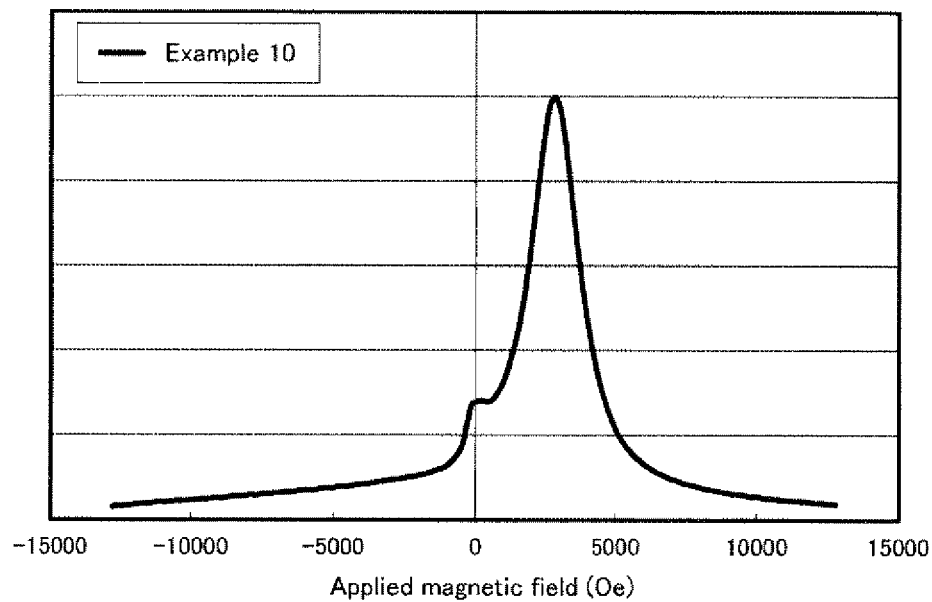

IRON BASED OXIDE MAGNETIC POWDER AND METHOD FOR PRODUCING SAME

TECHNICAL FIELD

The present invention relates to iron based oxide magnetic powder that is suitable for a high density magnetic recording medium, a radio wave absorber, and the like, particularly magnetic powder including particles having an average particle diameter in nanometer order, and to a method for producing the same.

BACKGROUND ART

While $\varepsilon$-$Fe_2O_3$ is an extremely rare phase in iron oxides, particles thereof having a size in nanometer order exhibit a great coercive force (Hc) of approximately 20 kOe ($1.59 \times 10^6$ A/m) at room temperature, and therefore a production method for synthesizing $\varepsilon$-$Fe_2O_3$ as a single phase has been investigated (see PTL 1 and NPLs 1 and 2). In the use of $\varepsilon$-$Fe_2O_3$ in a magnetic recording medium, such a procedure has been performed that a part of the Fe sites of $\varepsilon$-$Fe_2O_3$ are substituted by a trivalent metal, such as Al, Ga, and In, for controlling the coercive force since at present there is no material for a magnetic head having such a high saturated magnetic flux density that adapts to the magnetic recording medium, and the relationship between the coercive force and the radio wave absorption characteristics has been investigated (see PTL 2 and NPLs 3, 4, and 5).

In the field of magnetic recording, a magnetic recording medium having a high ratio of the reproduced signal level and the particulate noise (C/N ratio, carrier-to-noise ratio) has been developed, and downsizing of the magnetic particles constituting the magnetic recording layer is demanded for enhancing the recording density. However, the downsizing of the magnetic particles generally tends to cause deterioration of the environmental stability and the thermal stability thereof, which brings about the concern of deterioration of the magnetic characteristics of the magnetic particles under the use or storage environment, and therefore by substituting a part of Fe sites of $\varepsilon$-$Fe_2O_3$ by other metals excellent in thermal resistance, various partially substituted materials of $\varepsilon$-$Fe_2O_3$ have been developed that are represented by $\varepsilon$-$A_xB_yFe_{2-x-y}O_3$ or $\varepsilon$-$A_xB_yC_zFe_{2-x-y-z}O_3$ (wherein A represents a divalent metal element, such as Co, Ni, Mn, and Zn; B represents a tetravalent metal element, such as Ti; and C represents a trivalent metal element, such as In, Ga, and Al), have a reduced particle size and a variable coercive force, and are excellent in the environmental stability and the thermal stability (see PTL 3 and NPL 6).

$\varepsilon$-$Fe_2O_3$ is obtained as a stable phase having a size in nanometer order, and therefore the production thereof requires a special method. PTLs 1 to 3 describe the production method of $\varepsilon$-$Fe_2O_3$ by using fine crystals of iron oxyhydroxide formed through a liquid phase method as a precursor, and coating the precursor with a silicon oxide through a sol-gel method, followed by subjecting to a heat treatment, and the liquid phase method described includes a reverse micelle method using an organic solvent as the reaction medium and the method using only an aqueous solution as the reaction medium. However, the $\varepsilon$-$Fe_2O_3$ or the partially substituted materials of $\varepsilon$-$Fe_2O_3$ obtained by these methods has variation in magnetic properties, and thus it has been proposed that the magnetic characteristics are improved by removing the silicon oxide coating after the heat treatment and subjecting to a classification treatment.

For example, PTL 4 and PTL 5 describe the technique of subjecting $\varepsilon$-$Fe_2O_3$ or a partially substituted materials of $\varepsilon$-$Fe_2O_3$ produced by the reverse micelle method to centrifugal separation in ultrapure water. The use of ultrapure water as the dispersion medium is for enhancing the dispersibility of the slurry by decreasing the ion intensity of the medium. However, the $\varepsilon$-$Fe_2O_3$ or the partially substituted materials of $\varepsilon$-$Fe_2O_3$ inherently does not exhibit good dispersibility around neutrality, and therefore in the classification methods described in PTL 4 and PTL 5, the silicon oxide coating is necessarily partially left on the $\varepsilon$-$Fe_2O_3$ or the partially substituted materials of $\varepsilon$-$Fe_2O_3$ for providing good dispersibility in the neutral range, which causes a problem that the silicon oxide coating is again removed after the classification treatment.

PTL 6 describes the improvement of the aforementioned dispersion treatment method, in which NaOH is added to a slurry containing particles of $\varepsilon$-$Fe_2O_3$ or a partially substituted materials of $\varepsilon$-$Fe_2O_3$ produced by the reverse micelle method to control the pH of the dispersion liquid to 10 or more and 11 or less, and then performing the classification treatment. The $\varepsilon$-type iron based oxide magnetic powder obtained by this method has a narrower particle size distribution, a narrower coercive force distribution, and a smaller content of a non-magnetic component, than the magnetic powder obtained by the methods described in PTL 4 and PTL 5, but the particle size distribution and the coercive force distribution thereof are not sufficient for the application thereof to a magnetic recording medium.

CITATION LIST

Patent Literatures

PTL 1: JP-A-2008-174405
PTL 2: WO 2008/029861
PTL 3: WO 2008/149785
PTL 4: JP-A-2008-063199
PTL 5: JP-A-2008-063201
PTL 6: JP-A-2016-174135

Non-Patent Literatures

NPL 1: S. Ohkoshi, A. Namai, K. Imoto, M. Yoshikiyo, W. Tarora, K. Nakagawa, M. Komine, Y. Miyamoto, T. Nasu, S. Oka, and H. Tokoro, Scientific Reports, 5, 14414/1-9 (2015)

NPL 2: S. Sakurai, A. Namai, K. Hashimoto, and S. Ohkoshi, J. Am. Chem. Soc., 131, 18299-18303 (2009)

NPL 3: A. Namai, S. Sakurai, M. Nakajima, T. Suemoto, K. Matsumoto, M. Goto, S. Sasaki, and S. Ohkoshi, J. Am. Chem. Soc., 131, 1170-1173 (2009)

NPL 4: A. Namai, M. Yoshikiyo, K. Yamada, S. Sakurai, T. Coto, T. Yoshida, T Miyazaki, M. Nakajima, T. Suemoto, H. Tokoro, and S. Ohkoshi, Nature Communications, 3, 1035/1-6 (2012)

NPL 5: S. Ohkoshi, S. Kuroki, S. Sakurai, K. Matsumoto, K. Sato, and S. Sasaki, Angew. Chem. Int. Ed., 46, 8392-8395 (2007)

NPL 6: S. Ohkoshi, A. Namai, M. Yoshikiyo, K. Imoto, K. Tamasaki, K. Matsuno, O. Inoue, T. Ide, K. Masada, M. Goto, T. Goto, T. Yoshida and T. Miyazaki, Angew. Chem. Int. Ed., 55, 11403-11406 (2016). (Hot Paper)

SUMMARY OF INVENTION

Technical Problem

The $\varepsilon$-type iron based oxide magnetic powder obtained by the known production methods described in PTL 1 to 5 has excellent magnetic characteristics, but variation of the coercive force distribution thereof may be observed in some cases depending on the production conditions. According to the investigations by the present inventors, it has been found that the variation of the coercive force distribution is derived from the presence of fine particles having a small coercive force contained in the iron based oxide magnetic powder. Furthermore, the ε-type iron based oxide magnetic powder obtained by the production method described in PTL 6 has a smaller content of the aforementioned fine particles than the magnetic powder obtained by the production methods of PTLs 1 to 5, but the content of the fine particles is necessarily further decreased in consideration of the application thereof to a coating type high recording density magnetic recording medium.

Specifically, the curve obtained by numerical differentiation of the magnetic hysteresis curve (B-H curve) obtained by measuring the magnetic powder obtained by the existing method (the resulting curve is hereinafter referred to as a differential B-H curve) has two peaks observed therein. It is considered that the magnetic powder that corresponds to the peak that appear at a position with a higher applied magnetic field in the peaks, i.e., to the higher Hc component, contributes to the magnetic recording, but the magnetic powder that corresponds to the peak that appear at a position with a lower applied magnetic field, i.e., to the lower Hc component, does not contribute to the magnetic recording. Since the peak of the low Hc component of the differential B-H curve is lowered by decreasing the content of the fine particles, the magnetic characteristics of the magnetic powder can be improved by decreasing the content of the fine particles.

While the mechanism that the fine particles have low Hc is currently unclear, it is estimated that this is caused by either the heterogeneous phases for the ε-type iron based oxide, such as an α-type iron based oxide and a γ-type iron based oxide, contained, or the exhibition of superparamagnetism due to the small particle diameter.

In view of the aforementioned problems, the invention is to provide a method for producing ε-type iron based oxide magnetic powder that is largely improved in characteristics of the particle size distribution and the coercive force distribution.

Solution to Problem

The inventors have found that magnetic powder having a significantly decreased content of the fine particles can be obtained in such a manner that the pH of a slurry containing ε-type iron based oxide magnetic powder is set to an alkaline region where good dispersibility of the magnetic powder is obtained, and the slurry is classified in a state where a quaternary ammonium salt dissociated in the alkaline region, preferably a tetraalkylammonium salt, exists as a surface modifier in the slurry, and thus have completed the invention.

For solving the problem, the invention provides iron based oxide magnetic powder containing particles of an ε-iron oxide having an average particle diameter measured with a transmission electron microscope of 8 nm or more and 30 nm or less and a coefficient of variation of the particle diameter of 30% or less, and having a value of $I_L/I_H$ defined below of 0.55 or less.

$I_H$ represents an intensity of a peak that appears on a high magnetic field side in a differential B-H curve obtained by numerical differentiation of a B-H curve obtained by measuring under conditions of an applied magnetic field of 3,979 kA/m (50 kOe), an M measurement range of 0.005 A·m² (5 emu), an applied magnetic field change rate of 13 (kA/m·s), a time constant of 0.03 sec, and a wait time of 0.8 sec, and $I_L$ represents an intensity of an intercept of the ordinate at zero magnetic field in the differential B-H curve.

The invention also provides iron based oxide magnetic powder containing particles of an ε-iron oxide having Fe sites, a part of which is substituted by other metal elements, preferably one kind or two or more kinds of Ga, Co, and Ti, (hereinafter the ε-iron oxide and the ε-iron oxide having Fe sites, a part of which is substituted by other metal elements, each are referred to as an ε-type iron oxide) having an average particle diameter measured with a transmission electron microscope of 8 nm or more and 30 nm or less and a coefficient of variation of the particle diameter of 30% or less, and having a value of $I_L/I_H$ defined below of 0.55 or less.

$I_H$ represents an intensity of a peak that appears on a high magnetic field side in a differential B-H curve obtained by numerical differentiation of a B-H curve obtained by measuring under conditions of an applied magnetic field of 1,035 kA/m (13 kOe), an M measurement range of 0.005 A·m² (5 emu), an applied magnetic field change rage of 15 (kA/m·s), a time constant of 0.03 sec, and a wait time of 0.1 sec, and $I_L$ represents an intensity of an intercept of the ordinate at zero magnetic field in the differential B-H curve.

These kinds of the iron based oxide magnetic powder preferably has a squareness ratio SQ of 0.54 or more.

The invention further provides a method for producing iron based oxide magnetic powder, including: preparing a slurry containing particles of an ε-type iron based oxide having an average particle diameter measured with a transmission electron microscope of 5 nm or more and 100 nm or less and a coefficient of variation of the particle diameter of 70% or less; adding a quaternary ammonium salt, preferably a tetraalkylammonium salt, and more preferably a tetraalkylammonium hydroxide, as a surface modifier to the slurry, to make a concentration of 0.009 mol/kg or more and 1.0 mol/kg or less, and simultaneously to make pH of 11 or more and 14 or less; subjecting the surface modifier-containing slurry to a dispersion treatment to provide an ε-type iron based oxide-dispersed slurry; and classifying the ε-type iron based oxide-dispersed slurry.

In the ε-type iron based oxide-dispersed slurry, the iron based oxide preferably has an average secondary particle diameter measured with a dynamic light scattering particle size measurement device of 65 nm or less. The slurry containing particles of the iron based oxide preferably has a conductivity of 15 mS/m or less.

It is preferred that the classifying step includes subjecting the iron based oxide-dispersed slurry to a centrifugal separator, and then removing a supernatant, and the centrifugal acceleration in subjecting to the centrifugal separator is preferably 40,000 G or more.

Advantageous Effects of Invention

The use of the production method of the invention can provide iron based oxide magnetic powder that has a narrow particle size distribution and a particularly small content of fine particles that do not contribute to the enhancement of the magnetic recording characteristics, and consequently has a narrow coercive force distribution and is suitable for the enhancement of the recording density of the magnetic recording medium.

BRIEF DESCRIPTION OF DRAWINGS

FIG. 1 is the TEM image of the iron based oxide magnetic powder obtained in Example 1.
FIG. 2 is the differential B-H curve of the iron based oxide magnetic powder obtained in Comparative Example 2.

FIG. 3 is the differential B-H curve of the iron based oxide magnetic powder obtained in Example 4.

FIG. 4 is the differential B-H curve of the iron based oxide magnetic powder obtained in Example 10.

DESCRIPTION OF EMBODIMENTS

[Iron Based Oxide Magnetic Powder]

The production method of the invention is to produce ε-type iron based oxide magnetic powder that has an improved particle size distribution and an improved coercive force distribution, and examples of the ε-type iron based oxide capable of being used as the starting substance include the following.

Iron based oxide containing no substitution represented by the general formula ε-$Fe_2O_3$ Iron based oxide represented by the general formula ε-$C_zFe_{2-z}O_3$ (wherein C represents a trivalent metal element)

Iron based oxide represented by the general formula ε-$A_xB_yFe_{2-x-y}O_3$ (wherein A represents a divalent metal element, and B represents a tetravalent metal element)

Iron based oxide represented by the general formula ε-$A_xC_zFe_{2-x-z}O_3$ (wherein A represents a divalent metal element, and C represents a trivalent metal element)

Iron based oxide represented by the general formula ε-$B_yC_zFe_{2-y-z}O_3$ (wherein B represents a tetravalent metal element, and C represents a trivalent metal element)

Iron based oxide represented by the general formula ε-$A_xB_yC_zFe_{2-x-y-x}O_3$ (wherein A represents a divalent metal element, B represents a tetravalent metal element, and C represents a trivalent metal element)

The iron based oxide of the type having only the C element substituted has advantages that the coercive force of the magnetic particles can be arbitrarily controlled, and in addition, the same space group as ε-$Fe_2O_3$ can be readily obtained, but is slightly inferior in the thermal stability, and therefore it is preferred to substitute by the A or B element simultaneously.

The iron based oxide of the type having the two elements of A and B substituted has excellent thermal stability and can retain the high coercive force of the magnetic particles at ordinary temperature, but it is slightly difficult to obtain a single phase of the same space group as ε-$Fe_2O_3$.

The iron based oxide of the type having the three elements of A, B, and C substituted has the best balance among the aforementioned characteristics, is excellent in the thermal resistance, the easiness in providing the single phase, and the controllability of the coercive force, and thus is most preferred.

Examples of the substitution element include Co, Ni, Mn, and Zn for A, Ti and Sn for B, and In, Ga, and Al for C. In the type having the three elements substituted, the metal elements substituting a par a part of the Fe sites are preferably Ga, Co, and Ti from the standpoint of the balance of the practical characteristics.

In the iron based oxide having the three elements substituted, the preferred ranges of x, y, and z are as follows.

While x and y may have arbitrary ranges of 0<x<1 and 0<y<1, ranges of 0.01≤x≤0.2 and 0.01≤y≤0.2 are preferred since the coercive force of the magnetic particles of the iron oxide having the three elements substituted is necessarily changed to some extent from the non-substituted ε-$Fe_2O_3$ in consideration of the purpose of magnetic recording. While z also may be in a range of 0<z<1 similarly to x and y, a range of 0<z≤0.5 is preferred from the standpoint of the control of the coercive force and the easiness in providing the single phase.

In the production method of the invention, the ε-type iron based oxide used as the starting substance can retain the high coercive force at ordinary temperature by suitably controlling the value of y or the values of x and y, and can have a coercive force that is controlled to a desired value by controlling the values of x, y, and z.

The iron based oxide magnetic powder of the invention may contain an α-type iron oxide, a γ-type iron oxide, and $Fe_3O_4$ crystals, existing as impurities in addition to the ε-type iron based oxide crystals, and these materials are inclusively referred to as iron based oxide magnetic powder.

[Average Particle Diameter]

In the production method of the invention, the magnetic particles of the ε-type iron based oxide used as the starting substance are preferably fine to such an extent that the individual particle has a single magnetic domain structure. The average particle diameter thereof measured with a transmission electron microscope is preferably 100 run or less, and more preferably 30 nm or less. However, in the case where the average particle diameter is too small, the proportion of the fine particles that do not contribute to the enhancement of the magnetic characteristics is increased to deteriorate the magnetic characteristics per unit weight of the magnetic particle powder, and thus the average particle diameter is preferably 5 nm or more. The ε-type iron based oxide used as the starting substance in the invention may be produced by any of methods including the production methods described in PTLs 1 to 6. The average particle diameter after classifying by using the production method of the invention is preferably 8 nm or more and 30 nm or less.

[Coefficient of Variation]

Magnetic particles of an ε-type iron based oxide obtained by the ordinary production method generally has a coefficient of variation (which is hereinafter referred to as a CV value) of the average particle diameters of approximately from 35% to 70%.

The CV value is decreased by classifying by using the production method of the invention, and the CV value after classifying is preferably 30% or less, more preferably 25% or less, and further preferably 20% or less. The lower limit of the CV value is preferably as small as possible, and is generally 10% or more since the load of the production process is necessarily increased by decreasing the CV value.

The mechanism that the magnetic particles of the ε-type iron based oxide having a small CV value are obtained by using the production method of the invention is that aggregates of particles having an average particle diameter of 8 nm or less, which have been difficult to disperse, can be dispersed by using the quaternary ammonium salt as the surface modifier described later, and the particles of 8 nm or less can be removed by the classification operation thereafter.

[$I_L/I_H$]

In the measurement of a B-H curve for iron based oxide magnetic powder formed by the liquid phase method, when completing the degauss and increasing the external magnetic field, the increase curve of the magnetic flux density exhibits a small shoulder (depression) in the vicinity of zero magnetic field. Accordingly, two peaks are observed in the differential B-H curve obtained by numerical differentiation of the B-H curve. This means that the B-H curve measured for the iron based oxide magnetic powder is a synthesis of two B-H curves with different coercive forces Hc, and the iron based oxide magnetic powder contains two components that are different from each other in magnetic characteristics.

The component on the low Hc side is a component that does not contribute to the enhancement of the recording density in the use of the iron based oxide magnetic powder in a magnetic recording medium. By decreasing the proportion of the particles that are extremely finer than the average particle diameter contained in the iron based oxide magnetic powder through such measures as the change of the production conditions, the classification, and the like, the decrease of the height of the peak on the low Hc side of the differential B-H curve is observed, from which it is found that the fine particles are the low Hc component.

In consideration of the use of the iron based oxide magnetic powder as a magnetic recording medium, assuming that the intercept of the ordinate at zero magnetic field in the differential B-H curve is represented by $I_L$, and the peak height on the high Hc side therein is represented by $I_H$, the amount of the particles that do not contribute to the magnetic recording is decreased to increase the recording density with a lower value of the peak height ratio $I_L/I_H$.

Magnetic particles of an ε-type iron based oxide obtained by the ordinary production method generally have a value of $I_L/I_H$ of 3.0 or less. In the production method of the invention, the magnetic particles of the ε-type iron based oxide used as the starting substance preferably have a value of $I_L/I_H$ of 2.7 or less.

[Squareness Ratio SQ]

The iron based oxide magnetic powder obtained in the invention preferably has a squareness ratio SQ of 0.54 or more. In the field of the coating type magnetic recording medium, the squareness ratio (SQ) of the magnetic powder is demanded to be large from the standpoint of the magnetic powder suitable for the recording system. The squareness ratio (SQ=σr/σs) thereof is the ratio of the residual magnetization σr of the magnetic powder to the saturation magnetization σs of the magnetic powder in application of a magnetic field, and magnetic powder having a high SQ is demanded for producing a high performance coating type recording medium since the output thereof is enhanced by increasing the SQ.

[Iron Based Oxide Particle-Containing Slurry]

In the production method of the invention, a slurry containing magnetic particles of an ε-type iron based oxide as the starting substance dispersed in pure water is firstly prepared. In this case, the conductivity of the solvent constituting the slurry is preferably 15 mS/m or less from the standpoint of the suppression of the aggregation of the iron based oxide and the decrease of impurities. In the case where a slurry containing ε-type iron based oxide magnetic particles immediately after the production by the wet method and the removal of the silicon oxide coating with an alkali solution is used as the starting substance, the slurry is preferably washed with pure water to decrease the conductivity of the solvent to 15 mS/m or less. Thereafter, a quaternary ammonium salt is added to the slurry to control the pH of the slurry to 11 or more and 14 or less. In the case where a hydroxide of a tetraalkylammonium salt is used as the quaternary ammonium salt as described later, the pH of the slurry is in the range without the addition of another alkali.

The values of pH in the description herein are measured with a glass electrode according to JIS Z8802. The pH standard solution shows a value that is measured with a pH meter calibrated with a suitable buffer solution corresponding to the pH range to be measured. The values of pH in the description herein each are a value that is obtained by reading a measured value shown by a pH meter compensated with a temperature compensated electrode under a condition of the reaction temperature.

[Quaternary Ammonium Ion]

A quaternary ammonium ion is a cation formed by substituting all four hydrogen atoms of an ammonium ion ($NH_4^+$) by organic groups, and the substituents may be generally an alkyl group or an aryl group. In the production method of the invention, a quaternary ammonium ion is used as the surface modifier for the magnetic particles of the ε-type iron based oxide since it is stable in a strong alkaline region where good dispersibility of the magnetic particles is obtained. In the quaternary ammonium ion, a tetraalkylammonium ion is preferred due to the industrial availability thereof. The tetraalkylammonium ion is a quaternary ammonium cation, which is a polyatomic ion represented by the molecular formula $NR_4^+$ (wherein R represents an arbitrary alkyl group). A tetraalkylammonium salt is a fully dissociated salt, and the tetraalkylammonium ion exists as a stable ion in an alkali aqueous solution, and therefore is used in the production method of the invention as the surface modifier for improving the dispersibility of the ε-type iron based oxide in the slurry. While the supply source of the tetraalkylammonium ion includes a hydroxide, a chloride, a bromide, and the like, the hydroxide of the tetraalkylammonium ion is a strong alkali by itself, and thus the addition thereof to the slurry makes the pH of the slurry within the preferred pH range described above without addition of another alkali. Accordingly, a tetraalkylammonium hydroxide is more preferably used as the surface modifier.

A chloride or a bromide of the tetraalkylammonium ion may also be used as the supply source of the tetraalkylammonium ion, but in this case, the increase of the pH in the addition of these salts to the slurry is suppressed, and another alkali is required for controlling the pH, increasing the ion intensity of the system. Therefore, these salts are slightly inferior in dispersibility of the ε-type iron based oxide, as compared to the use of the hydroxide.

The tetraalkylammonium salt includes a quaternary ammonium salt having the same alkyl groups, such as a tetramethylammonium salt, a tetrapropylammonium salt, and a tetrabutylammonium salt, and a quaternary ammonium salt having different alkyl groups, both of which may be used, and hydroxides thereof, such as tetramethylammonium hydroxide, tetrapropylammonium hydroxide, and tetrabutylammonium hydroxide, are preferably used.

The concentration of the tetraalkylammonium ion is 0.009 mol/kg or more and 1.0 mol/kg or less for modifying the surface of the ε-type iron based oxide particles in the slurry to enhance the dispersibility thereof. In the case where the concentration is less than 0.009 mol/kg or more than 1.0 mol/kg, the effect of improving the dispersibility becomes insufficient, failing to provide a CV value of 30% or less after classifying.

[Dispersion Treatment]

In the production method of the invention, the surface modifier-containing slurry having the surface modifier added thereto is subjected to a dispersion treatment to provide an iron based oxide-dispersed slurry. The dispersion treatment herein is a treatment for breaking the aggregation of the aggregates of the ε-type iron based oxide contained in the surface modifier-containing slurry. The dispersion treatment method may be known methods, such as dispersion with an ultrasonic dispersion device, pulverization with a medium, e.g., a bead mill, and agitation with an agitation blade, a shaking machine, or a shaker.

The dispersion treatment of the surface modifier-containing slurry is preferably performed until the average secondary particle diameter of the iron based oxide measured with a dynamic light scattering particle size measurement device (i.e., the DLS particle diameter) reaches 65 nm or less. The state where the DLS particle diameter exceeds 65 nm is not preferred since a CV value of 30% or less may not be obtained in the case where the particle diameter is small, for example, the TEM average particle diameter is 20 nm or less.

[Classification Operation]

In the production method of the invention, the surface modifier-containing slurry having the surface modifier added thereto is subjected to the dispersion treatment, and the iron based oxide-dispersed slurry is subjected to a classification operation. The classification operation employed may be a known wet classification method, such as a centrifugal separation method. After subjecting to a centrifugal separator, the fine particles can be removed by removing the supernatant, and after subjecting to a centrifugal separator, the coarse particles can be removed by removing the precipitate. The gravitational acceleration in the centrifugal separation is preferably 40,000 G or more. The classification operation is preferably repeated three times or more. After the classification operation, the iron based oxide magnetic powder is recovered by a known solid-liquid separation method, washed water depending on necessity, and then dried.

[Transmission Electron Microscope (TEM) Observation]

The TEM observation of the iron based oxide magnetic powder obtained by the production method of the invention is performed under the following conditions. The TEM observation is performed by using JEM-1011, produced by JEOL, Ltd. For the observation of the particles, TEM images obtained at a magnification of 10,000 and a magnification of 100,000 are used (images after removing the silicon oxide coating are used).

Measurement of Average Particle Diameter and Particle Size Distribution Evaluation (Coefficient of Variation (%))

A digitizer is used for the TEM average particle diameter and the particle size distribution evaluation (coefficient of variation (%)). The image processing software used is Mac-View Ver. 4.0. By using the image processing software, the particle diameter of a particle is calculated as the length of the longer edge of the rectangle circumscribed on the particles having the smallest area among the rectangles circumscribed thereon. The number of particles measured is 200 or more.

Among the particles appearing on a transmission electron microscope image, the particles to be measured are selected based on the following standard.

[1] A particle that partially protrudes outside the image is not measured.

[2] A particle that has a clear contour and stands alone is measured.

[3] A particle that stands alone and can be measured as a single particle is measured even though the shape thereof deviates from the average particle shape.

[4] Particles that overlap each other each are measured as a single particle in the case where the boundary between the particles is clear, and the shapes of the particles can be distinguished.

[5] Particles that overlap each other are not measured as unable to distinguish the shape of the particle in the case where the boundary between the particles is not clear, and the shapes of the particles cannot be distinguished.

The number average value of the particle diameters of the particles selected based on the standard is calculated and designated as the average particle diameter by TEM observation of the iron based oxide magnetic powder. A value is calculated by dividing the "standard deviation of the particle diameters of the selected particles" by the "number average value of the particle diameters of the selected particles (average particle diameter)" and designated as the coefficient of variation of the particle diameter by TEM observation of the iron based oxide magnetic powder.

[Measurement of Average Secondary Particle Diameter]

The average secondary particle diameter (i.e., the DLS particle diameter) of the surface modifier-containing slurry obtained by the production method of the invention is measured under the following conditions.

The dynamic light scattering particle size measurement device used is FPAR-1000 K (high sensitivity type), produced by Otsuka Electronics Co., Ltd., and a thin film probe is used as a fiber probe. The measurement conditions are a measurement time of 180 seconds, a repetition number of 1, a solvent setting for water, and the analysis mode for the cumulant method.

[Compositional Analysis by Inductively Coupled Plasma Atomic Emission Spectroscopy (ICP)]

The resulting ε-type iron based oxide magnetic powder is subjected to compositional analysis. For the compositional analysis, ICP-720ES, produced by Agilent Technologies, Inc., is used, and the measurement is performed at a measurement wavelength (nm) of 259.940 nm for Fe, 294.363 nm for Ga, 230.786 nm for Co, and 336.122 nm for Ti.

[Measurement of Magnetic Hysteresis Curve (B-H Curve)]

The resulting ε-type iron based oxide magnetic powder is measured for the magnetic characteristics under the following conditions.

For the iron based oxide magnetic powder formed of particles of an ε-iron oxide, the magnetic characteristics measurement device used is a vibration sample magnetometer (VSM) (VSM-5HSC, produced by Toei Industry Co., Ltd.), and the magnetic characteristics are measured at an applied magnetic field of 3,979 kA/m (50 kOe), an M measurement range of 0.005 A·m$^2$ (5 emu), an applied magnetic field change rate of 13 (kA/m·s), a time constant of 0.03 sec, and a wait time of 0.8 sec. The coercive force Hc, the saturation magnetization σs, SFD, and the squareness ration SQ are evaluated from the B-H curve, and the low Hc component that does not contribute to magnetic recording is evaluated from the differential B-H curve. In this case, the intensity of the intercept of the ordinate at zero magnetic field in the differential B-H curve is represented by $I_L$, and the intensity of a peak that appears on the high Hc side therein is represented by $I_H$. The SFD herein is a value obtained by dividing the half value width of the peak on the high Hc side by the coercive force Hc. In the measurement and evaluation, "High-temperature Superconduction VSM Measurement Program" software (Ver. 1.0.0.1) is used.

For the iron based oxide magnetic powder formed of particles of an ε-iron oxide having Fe sites, a part of which is substituted by other metal elements, the magnetic characteristics measurement device used is a vibration sample magnetometer (VSM) (VSM-5, produced by Toei Industry Co., Ltd.), and the magnetic characteristics are measured at an applied magnetic field of 1,035 kA/m (13 kOe), an M measurement range of 0.005 A·m$^2$ (5 emu), an applied magnetic field change rate of 15 (kA/m·s), a time constant of 0.03 sec, and a wait time of 0.1 sec. The coercive force Hc, the saturation magnetization σs, SFD, and the squareness ration SQ are evaluated from the B-H curve, and the low Hc component that does not contribute to magnetic recording is evaluated from the differential B-H curve. In this case, the intensity of the intercept of the ordinate at zero magnetic field in the differential B-H curve is represented by $I_L$, and the intensity of a peak that appears on the high Hc side therein is represented by $I_H$. The SFD herein is a value obtained by dividing the half value width of the peak on the high Hc side by the coercive force Hc. In the measurement and evaluation, the accompanying software (Ver. 2.1), produced by Toei Industry Co., Ltd., is used. The measurement conditions are differentiated between the ε-iron oxide and the ε-iron oxide having Fe sites, a part of which is substituted by other metal elements, since the coercive force Hc is changed to change the applied magnetic fields capable of saturating the magnetization depending on the substitution amount of the metal elements. The squareness ratio SQ is for the entire B-H curve.

EXAMPLES

Example 1

In a 5 L reaction tank, 465.93 g of iron(III) nitrate nonahydrate having a purity of 99.7%, 152.80 g of a Ga(III) nitrate solution having a Ga concentration of 12.0% by mass, 15.78 g of cobalt(II) nitrate hexahydrate having a purity of 97%, and 11.91 g of a titanium(IV) sulfate solution having a Ti concentration of 15.1% by mass were dissolved in 2,453.58 g of pure water in the air atmosphere under a condition of 40° C. under mechanical agitation with an agitation blade. The resulting preparation solution had a molar ratio of metal ions of Fe/Ga/Co/Ti 1.530/0.350/0.070/0.050.

268.52 g of an ammonia aqueous solution of 22.4% was added at one time to the solution in the air atmosphere at 40° C. under mechanical agitation with an agitation blade, followed by continuously agitating for 2 hours (first neutralization step). The brown turbid liquid in the initial state after the addition was changed to a brown reaction liquid having transparency after 2 hours, which had pH of 1.9.

288.75 g of a citric acid solution having a citric acid concentration of 20% by mass as a hydroxycarboxylic acid was added to the solution continuously over 1 hour under a condition of 40° C. (hydroxycarboxylic acid adding step), and then 152.86 g of an ammonia aqueous solution of 22.4% was added thereto at one time, followed by retaining for 1 hour under a condition of 40° C. under agitation, so as to form crystals of iron oxyhydroxide containing substitution elements as a precursor as an intermediate product (procedure 1, second neutralization step). The solution had pH of 8.6 after the addition of 152.86 g of an ammonia solution at one time.

Thereafter, 416.89 g of tetraethoxysilane (TEOS) was added to the precursor slurry obtained in the procedure 1 over 35 minutes in the air atmosphere at 40° C. under agitation. The mixture was further agitated for approximately one day for coating with a hydrolyzate of the silane compound through hydrolysis. Thereafter, the resulting solution was washed and subjected to solid-liquid separation, so as to recover as a cake (procedure 2).

The precipitate (i.e., the precursor coated with gel-like $SiO_2$) obtained in the procedure 2 was dried, and the resulting dried powder was subjected to a heat treatment in a furnace in the air atmosphere at 971° C. for 4 hours, so as to provide powder of a substituted type ε-iron oxide coated with the silicon oxide. The hydrolyzate of the silane compound was changed to an oxide in the heat treatment in the air atmosphere (procedure 3).

The powder of the substituted type ε-iron oxide coated with the silicon oxide obtained in the procedure 3 was agitated in a 20% by mass NaOH aqueous solution at approximately 60° C. for 24 hours to remove the silicon oxide on the surface of the particles, thereby providing a slurry containing iron based oxide particles (procedure 4).

The observation of the slurry obtained in the procedure 4 with a transmission electron microscope revealed that the TEM average particle diameter was 17.8 nm, and the coefficient of variation (CV value) was 39%.

The slurry obtained in the procedure 4 was washed until the conductivity became 15 mS/m or less to provide a washed slurry of Example 1. The resulting washed slurry was controlled to have pH of 6.5 by adding a sulfuric acid aqueous solution of 1% by mass, then filtered with a membrane, recovered as a cake, and dried, so as to provide iron based oxide magnetic powder before classification. The iron based oxide magnetic powder before classification had a coercive force of 171 (kA/m), a saturation magnetization of 15.7 ($Am^2$/kg), a squareness ratio of 0.433, SFD of 1.40, a value of $I_L/I_H$ of 0.82, and a BET specific surface area of 85.5 $m^2$/g.

An aqueous solution of tetramethylammonium hydroxide (hereinafter referred to as TMAOH) of 25% by mass as a surface modifier was added to the washed slurry, so as to provide a surface modifier-containing slurry of Example 1. The addition amount of TMAOH aqueous solution was such an amount that provided a TMAOH concentration in the surface modifier-containing slurry of 0.065 mol/kg. In this case, the slurry had pH of 13. In this example, it was confirmed that in the case where the TMAOH concentration was 0.009 mol/kg or more and 1.0 mol/kg or less, the pH of the slurry became 11 or more and 14 or less.

40 g of the resulting surface modifier-containing slurry was subjected to an ultrasonic dispersion treatment with an ultrasonic cleaning machine (Bransonic Yamato 5510, produced by Yamato Scientific Co., Ltd.) for 1 hour, and then subjected to a centrifugal separation treatment with R20A2 rotor of a centrifugal separator (himac CR21GII, produced by Hitachi Koki Co., Ltd.) at a rotation number of 20,000 rpm for 15 minutes, followed by removing 33 g of the supernatant containing fine particles, so as to provide a precipitate. The gravitational acceleration in the centrifugal separation was 48,000 G. After subjecting to the ultrasonic treatment, the average secondary particle diameter (DLS particle diameter) of the iron based oxide in the surface modifier-containing slurry measured was 29 nm.

Thereafter, 33 g of a TMAOH aqueous solution of 0.065 mol/kg was added to the resulting precipitate, and the operation of the aforementioned ultrasonic dispersion treatment, the aforementioned centrifugal separation treatment, and the removal of 33 g of the supernatant was repeated 9 times to provide a slurry of the iron based oxide magnetic powder of Example 1.

The TEM observation of the resulting slurry of the iron based oxide magnetic powder of Example 1 revealed that the TEM average particle diameter was 18.8 nm, and the coefficient of variation (CV value) was 29%. The TEM observation of the slurry meant that the slurry was dropped and attached to a collodion film on a grid, spontaneously dried, to which carbon was vapor-deposited, and then subjected to TEM observation. FIG. 1 shows the TEM image of the iron based oxide magnetic powder obtained in this example. The white vertical line at the left center part of the TEM image has a length of 50 nm.

33 g of pure water was added to the resulting slurry of the iron based oxide magnetic powder of Example 1, the pH of which was controlled to 6.5 by adding a sulfuric acid aqueous solution of 1% by mass, then filtered with a membrane, recovered as a cake, and then dried, so as to provide iron based oxide magnetic powder of Example 1.

The chemical composition of the resulting iron based oxide magnetic powder was calculated to make a total value of molar ratios of Fe, Ga, Co, and Ti of 2.0, and the results are shown in Table 2. The value of $I_L/I_H$ was 0.25.

The production conditions of Examples of the invention and Comparative Examples are shown in Table 1, and the characteristic values of the iron based oxide magnetic powder obtained in Examples and Comparative Examples are shown in Table 2.

Example 2

33 g of a TMAOH aqueous solution of 0.065 mol/kg was added to 7 g of the slurry of the iron based oxide magnetic powder obtained in Example 1, and the mixture was subjected to an ultrasonic dispersion treatment with an ultrasonic cleaning machine (Bransonic Yamato 5510, produced by Yamato Scientific Co., Ltd.) for 1 hour, and then subjected to a centrifugal separation treatment with R20A2 rotor of a centrifugal separator (himac CR21GII, produced by Hitachi Koki Co., Ltd.) at a rotation number of 18,000 rpm for 15 minutes, followed by removing 33 g of the supernatant containing fine particles, so as to provide a precipitate. The gravitational acceleration in the centrifugal separation was 39,000 G. For the resulting precipitate, the operation of the addition of the TMAOH aqueous solution, the ultrasonic dispersion, the centrifugal separation at 18,000 rpm, and the removal of the supernatant was repeated twice.

Thereafter, 33 g of a TMAOH aqueous solution of 0.065 mol/kg was added to the resulting precipitate, and the mixture was subjected to an ultrasonic dispersion treatment with an ultrasonic cleaning machine (Bransonic Yamato 5510, produced by Yamato Scientific Co., Ltd.) for 1 hour, and then subjected to a centrifugal separation treatment with R20A2 rotor of a centrifugal separator (himac CR21GII, produced by Hitachi Kaki Co., Ltd.) at a rotation number of 16,000 rpm for 15 minutes, followed by removing 30 g of the supernatant containing fine particles, so as to provide a precipitate. The gravitational acceleration in the centrifugal separation was 31,000 G. For the resulting precipitate, the operation of the addition of the TMAOH aqueous solution, the ultrasonic dispersion, the centrifugal separation at 16,000 rpm, and the removal of the supernatant was further repeated twice.

The resulting precipitate was subjected to a centrifugal separation treatment at a rotation number of 14,000 rpm (gravitational acceleration: 24,000 G) for 15 minutes, a centrifugal separation treatment at a rotation number of 12,000 rpm (gravitational acceleration: 17,000 G) for 15 minutes, and a centrifugal separation treatment at a rotation number of 10,000 rpm (gravitational acceleration: 12,000 G) for 15 minutes, 3 times for each treatments. The supernatants removed in the first, second, and third centrifugal separation treatments at a rotation number of 10,000 rpm were mixed to provide a slurry of iron based oxide magnetic powder of Example 2.

The TEM observation of the slurry of the iron based oxide magnetic powder obtained in Example 2 revealed that the TEM average particle diameter was 21.0 nm, and the coefficient of variation (CV value) was 22%.

30 g of pure water was added to the resulting slurry of the iron based oxide magnetic powder of Example 2, the pH of which was controlled to 6.5 by adding a sulfuric acid aqueous solution of 1% by mass, then filtered with a membrane, recovered as a cake, and then dried, so as to provide iron based oxide magnetic powder of Example 2.

Example 3

In a 50 L reaction tank, 4.93 kg of iron(III) nitrate nonahydrate having a purity of 99.5%, 1.05 kg of a Ga(III) nitrate solution having a Ga concentration of 13.2% by mass, 101.5 g of cobalt(II) nitrate hexahydrate having a purity of 97%, and 178.7 g of a titanium(IV) sulfate solution having a Ti concentration of 15.1% by mass were dissolved in 23.74 kg of pure water in the air atmosphere under a condition of 40° C. under mechanical agitation with an agitation blade. The resulting preparation solution had a molar ratio of metal ions of Fe/Ga/Co/Ti 1.615/0.265/0.045/0.075.

2.51 kg of an ammonia aqueous solution of 23.6% was added at one time to the solution in the air atmosphere at 40° C. under mechanical agitation with an agitation blade, followed by continuously agitating for 2 hours (first neutralization step). The brown turbid liquid in the initial state after the addition was changed to a brown reaction liquid having transparency after 2 hours, which had pH of 1.9.

2.88 kg of a citric acid solution having a citric acid concentration of 20% by mass as a hydroxycarboxylic acid was added to the solution continuously over 1 hour under a condition of 40° C. (hydroxycarboxylic acid adding step), and then 1.70 kg of an ammonia aqueous solution of 23.6% was added thereto at one time, followed by retaining for 1 hour under a condition of 40° C. under agitation, so as to form crystals of iron oxyhydroxide containing substitution elements as a precursor as an intermediate product (procedure 5, second neutralization step). The solution had pH of 8.8 after the addition of 1.70 kg of an ammonia solution at one time.

Thereafter, 8.55 kg of tetraethoxysilane was added to the precursor slurry obtained in the procedure 5 over 35 minutes in the air atmosphere at 40° C. under agitation. The mixture was further agitated for approximately one day for coating with a hydrolyzate of the silane compound through hydrolysis. Thereafter, the resulting solution was washed and subjected to solid-liquid separation, so as to recover as a cake (procedure 6).

The precipitate (i.e., the precursor coated with gel-like SiO$_2$) obtained in the procedure 6 was dried, and the resulting dried powder was subjected to a heat treatment in a furnace in the air atmosphere at 1,025° C. for 4 hours, so as to provide powder of a substituted type ε-iron oxide coated with the silicon oxide. The hydrolyzate of the silane compound was changed to an oxide in the heat treatment in the air atmosphere (procedure 7).

The powder of the substituted type ε-iron oxide coated with the silicon oxide obtained in the procedure 7 was agitated in a 20% by mass NaOH aqueous solution at approximately 60° C. for 24 hours to remove the silicon oxide on the surface of the particles, thereby providing a slurry containing iron based oxide particles (procedure 8).

The observation of the slurry obtained in the procedure 8 with a transmission electron microscope revealed that the TEM average particle diameter was 14.9 nm, and the coefficient of variation (CV value) was 40%.

The slurry obtained in the procedure 8 was washed until the conductivity became 1 mS/m or less to provide a slurry of Example 2. The resulting washed slurry was controlled to have pH of 6.5 by adding a sulfuric acid aqueous solution of 1% by mass, then filtered with a membrane, recovered as a cake, and dried, so as to provide iron based oxide magnetic powder before classification. The iron based oxide magnetic powder before classification had a coercive force of 224 (kA/m), a saturation magnetization of 14.7 (Am$^2$/kg), a squareness ratio of 0.474, SFD of 1.55, a value of $I_L/I_H$ of 0.91, and a BET specific surface area of 89.0 m$^2$/g.

An aqueous solution of TMAOH of 25% by mass as a surface modifier was added to the washed slurry in such an amount that provided a TMAOH concentration in a surface modifier-containing slurry of 0.018 mol/kg, so as to provide a surface modifier-containing slurry. In this case, the surface modifier-containing slurry had pH of 12.

40 g of the resulting surface modifier-containing slurry was subjected to an ultrasonic dispersion treatment with an ultrasonic cleaning machine (Bransonic Yamato 5510, produced by Yamato Scientific Co., Ltd.) for 1 hour, and then subjected to a centrifugal separation treatment with R20A2 rotor of a centrifugal separator (himac CR21GII, produced by Hitachi Koki Co., Ltd.) at a rotation number of 20,000 rpm for 15 minutes, followed by removing 33 g of the supernatant containing fine particles, so as to provide a precipitate. The gravitational acceleration in the centrifugal separation was 48,000 G. After subjecting to the ultrasonic treatment, the average secondary particle diameter of the iron based oxide in the surface modifier-containing slurry measured was 54 nm.

Thereafter, 33 g of a TMAOH aqueous solution of 0.018 mol/kg as a surface modifier was added to the resulting precipitate, and the operation of the aforementioned ultrasonic dispersion treatment, the aforementioned centrifugal separation treatment and the removal of 33 g of the supernatant was repeated 9 times to provide a slurry of the iron based oxide magnetic powder of Example 3. The TEM observation of the resulting slurry of the iron based oxide magnetic powder revealed that the TEM average particle diameter was 16.8 nm, and the coefficient of variation (CV value) was 29%.

33 g of pure water was added to the resulting slurry of the iron based oxide magnetic powder, the pH of which was controlled to 6.5 by adding a sulfuric acid aqueous solution of 1% by mass, then filtered with a membrane, recovered as a cake, and then dried, so as to provide iron based oxide magnetic powder.

Example 4

A surface modifier-containing slurry, a slurry of iron based oxide magnetic powder, and iron based oxide magnetic powder were obtained in the same procedures as in Example 3 except that TMAOH as the surface modifier was added to the washed slurry in such an amount that provided a TMAOH concentration in the surface modifier-containing slurry of 0.065 mol/kg, and the concentration of the TMAOH aqueous solution added to the precipitate obtained after the centrifugal separation treatment and the removal of the supernatant was changed to 0.065 mol/kg. In this case, the surface modifier-containing slurry had pH of 13.

FIGS. 2 and 3 show the (normalized) differential B-H curves of the ε-type iron based oxide magnetic powder obtained in Comparative Example 2 and this example respectively. These figures are normalized to make the heights of the peaks on the high Hc side identical, and the ordinate (dB/dH) is an arbitrary intensity.

Two peaks were clearly observed in the differential B-H curve, and the proportion of the low Hc component $I_L/I_H$ was 0.28. The value of $I_L/I_H$ was better than that of the ε-iron oxide magnetic powder obtained in Comparative Example described later, from which it was found that the production method of the invention lowered the value of $I_L/I_H$ and narrowed the coercive force distribution.

Example 5

A surface modifier-containing slurry, a slurry of iron based oxide magnetic powder, and iron based oxide magnetic powder were obtained in the same procedures as in Example 3 except that TMAOH as the surface modifier was added to the washed slurry in such an amount that provided a TMAOH concentration in the surface modifier-containing slurry of 0.57 mol/kg, and the concentration of the TMAOH aqueous solution added to the precipitate obtained after the centrifugal separation treatment and the removal of the supernatant was changed to 0.57 mol/kg. In this case, the surface modifier-containing slurry had pH of 14.

Example 6

A surface modifier-containing slurry, a slurry of iron based oxide magnetic powder, and iron based oxide magnetic powder were obtained in the same procedures as in Example 4 except that a shaking treatment was performed with a shaker (a high speed shaker, model name: Cute Mixer, produced by AS ONE Corporation) under a condition of 1,500 rpm, instead of the ultrasonic dispersion treatment with the ultrasonic dispersion device. In this case, the surface modifier-containing slurry had pH of 13.

Comparative Example 1

A slurry of iron based oxide magnetic powder and iron based oxide magnetic powder were obtained in the same procedures as in Example 3 except that the TMAOH aqueous solution was not added to the washed slurry. To the precipitate obtained after the centrifugal separation treatment and the removal of the supernatant, pure water was added instead of the TMAOH aqueous solution.

The average secondary particle diameter of the washed slurry after subjecting to the ultrasonic dispersion treatment was 81 nm.

Comparative Example 2

A surface modifier-containing slurry, a slurry of iron based oxide magnetic powder, and iron based oxide magnetic powder were obtained in the same procedures as in Example 3 except that a 25% by mass TMAOH aqueous solution as the surface modifier was added to the washed slurry in such an amount that provided a TMAOH concentration in the surface modifier-containing slurry of 0.0012 mol/kg, and the concentration of the TMAOH aqueous solution added to the precipitate obtained after the centrifugal separation treatment and the removal of the supernatant was changed to 0.0012 mol/kg. In this case, the surface modifier-containing slurry had pH of 9.

Comparative Example 3

A surface modifier-containing slurry, a slurry of iron based oxide magnetic powder, and iron based oxide magnetic powder were obtained in the same procedures as in Example 3 except that a 25% by mass TMAOH aqueous solution as the surface modifier was added to the washed slurry in such an amount that provided a TMAOH concentration in the surface modifier-containing slurry of 0.0036 mol/kg, and the concentration of the TMAOH aqueous solution added to the precipitate obtained after the centrifugal separation treatment and the removal of the supernatant was changed to 0.0036 mol/kg. In this case, the surface modifier-containing slurry had pH of 10.

Comparative Example 4

A surface modifier-containing slurry, a slurry of iron based oxide magnetic powder, and iron based oxide magnetic powder were obtained in the same procedures as in Example 3 except that a 25% by mass TMAOH aqueous solution as the surface modifier was added to the washed slurry in such an amount that provided a TMAOH concentration in the surface modifier-containing slurry of 0.0072 mol/kg, and the concentration of the TMAOH aqueous solution added to the precipitate obtained after the centrifugal separation treatment and the removal of the supernatant was changed to 0.0072 mol/kg. In this case, the surface modifier-containing slurry had pH of 11.

Comparative Example 5

A surface modifier-containing slurry, a slurry of iron based oxide magnetic powder, and iron based oxide magnetic powder were obtained in the same procedures as in Example 3 except that a 10% by mass NaOH aqueous solution was added to the washed slurry to control the pH to 11, and a NaOH aqueous solution having pH of 11 was added to the precipitate obtained after the centrifugal separation treatment and the removal of the supernatant, instead of the TMAOH aqueous solution.

Example 7

In a 5 L reaction tank, 410.4 g of iron(III) chloride hexahydrate having a purity of 99.0% was dissolved in 2,689.7 g of pure water in the air atmosphere under a condition of 20° C. under mechanical agitation with an agitation blade.

267.1 g of an ammonia solution of 23.0% was added at one time to the solution in the air atmosphere at 20° C. under mechanical agitation with an agitation blade, followed by continuously agitating for 2 hours (first neutralization step).

288.8 g of a citric acid solution having a citric acid concentration of 20% by mass as a hydroxycarboxylic acid was added to the solution continuously over 1 hour under a condition of 20° C. (hydroxycarboxylic acid adding step), and then 180.4 g of an ammonia solution of 23.0% was added thereto at one time, followed by retaining for 1 hour under a condition of 20° C. under agitation, so as to form crystals of iron oxyhydroxide as a precursor as an intermediate product (procedure 1, second neutralization step).

Thereafter, 834.2 g of tetraethoxysilane was added to the precursor slurry obtained in the procedure 1 over 35 minutes in the air atmosphere at 40° C. under agitation. The mixture was further agitated for approximately one day for coating with a hydrolyzate of the silane compound through hydrolysis. Thereafter, the resulting solution was washed and subjected to solid-liquid separation, so as to recover as a cake (procedure 2).

The precipitate (i.e., the precursor coated with gel-like $SiO_2$) obtained in the procedure 2 was dried, and the resulting dried powder was subjected to a heat treatment in a furnace in the air atmosphere at 1,042° C. for 4 hours, so as to provide powder of an ε-iron oxide coated with the silicon oxide. The hydrolyzate of the silane compound was changed to an oxide in the heat treatment in the air atmosphere (procedure 3).

The powder of the ε-iron oxide coated with the silicon oxide obtained in the procedure 3 was agitated in a 20% by mass NaOH aqueous solution at approximately 60° C. for 24 hours to remove the silicon oxide on the surface of the particles, thereby providing a slurry containing iron based oxide particles (procedure 4).

The observation of the slurry obtained in the procedure 4 with a transmission electron microscope revealed that the TEM average particle diameter was 16.2 nm, and the coefficient of variation (CV) was 43%.

The slurry obtained in the procedure 4 was washed until the conductivity became 1 mS/m or less to provide a washed slurry of Example 7. The resulting washed slurry was controlled to have pH of 6.5 by adding a sulfuric acid aqueous solution of 1% by mass, then filtered with a membrane, recovered as a cake, and dried, so as to provide iron based oxide magnetic powder before classification. The iron based oxide magnetic powder before classification had a coercive force of 1,385 (kA/m), a saturation magnetization of 15.1 ($Am^2$/kg), a squareness ratio of 0.533, SFD of 0.73, a value of $I_L/I_H$ of 0.30, and a BET specific surface area of 80.6 $m^2$/g.

A TMAOH aqueous solution of 25% by mass as a surface modifier was added to the washed slurry in such an amount that provided a TMAOH concentration in a surface modifier-containing slurry of 0.065 mol/kg, so as to provide a surface modifier-containing slurry.

40 g of the resulting surface modifier-containing slurry was subjected to an ultrasonic dispersion treatment with an ultrasonic cleaning machine (Bransonic Yamato 5510, produced by Yamato Scientific Co., Ltd.) for 1 hour, and then subjected to a centrifugal separation treatment with R20A2 rotor of a centrifugal separator (himac CR21GII, produced by Hitachi Koki Co., Ltd.) at a rotation number of 20,000 rpm for 15 minutes, followed by removing 33 g of the supernatant containing fine particles, so as to provide a precipitate. The gravitational acceleration in the centrifugal separation was 48,000 G. After subjecting to the ultrasonic treatment, the average secondary particle diameter of the surface modifier-containing slurry measured was 59 nm.

Thereafter, 33 g of a TMAOH aqueous solution of 0.065 mol/kg as a surface modifier was added to the resulting precipitate, and the operation of the aforementioned ultrasonic dispersion treatment, the aforementioned centrifugal separation treatment, and the removal of 33 g of the supernatant was repeated 9 times to provide a slurry of the iron based oxide magnetic powder of Example 7. The supernatants removed in the first, second, and third centrifugal separation treatments repeated were mixed to provide a supernatant slurry of Example 7. The supernatant slurry of Example 7 was used in Example 8 described later. The TEM observation of the resulting slurry of the iron based oxide magnetic powder of Example 7 revealed that the TEM average particle diameter was 20.8 nm, and the coefficient of variation (CV value) was 28%.

33 g of pure water was added to the resulting slurry of the iron based oxide magnetic powder, the pH of which was controlled to 6.5 by adding a sulfuric acid aqueous solution of 1% by mass, then filtered with a membrane, recovered as a cake, and then dried, so as to provide iron based oxide magnetic powder.

Example 8

40 g of the supernatant slurry of Example 7 was subjected to an ultrasonic dispersion treatment with an ultrasonic cleaning machine (Bransonic Yamato 5510, produced by Yamato Scientific Co., Ltd.) for 1 hour, and then subjected to a centrifugal separation treatment with R20A2 rotor of a centrifugal separator (himac CR21GII, produced by Hitachi Koki Co., Ltd.) at a rotation number of 20,000 rpm for 15 minutes, followed by removing 30 g of the supernatant containing fine particles, so as to provide a precipitate. The gravitational acceleration in the centrifugal separation was 48,000 G. The resulting precipitate was subjected twice to the operation of the addition of a TMAOH aqueous solution of 0.065 mol/kg, the ultrasonic dispersion, the centrifugal separation at 20,000 rpm, and the removal of the supernatant.

Thereafter, 30 g of a TMAOH aqueous solution of 0.065 mol/kg was added to the resulting precipitate, and the mixture was subjected to an ultrasonic dispersion treatment with an ultrasonic cleaning machine (Bransonic Yamato 5510, produced by Yamato Scientific Co., Ltd.) for 1 hour, and then subjected to a centrifugal separation treatment with R20A2 rotor of a centrifugal separator (himac CR21GII, produced by Hitachi Koki Co., Ltd.) at a rotation number of 18,000 rpm for 15 minutes, followed by removing 30 g of the supernatant containing fine particles, so as to provide a precipitate. The gravitational acceleration in the centrifugal separation was 39,000 G. For the resulting precipitate, the operation of the addition of the TMAOH aqueous solution, the ultrasonic dispersion, the centrifugal separation at 18,000 rpm, and the removal of the supernatant was further repeated twice.

The resulting precipitate was subjected to a centrifugal separation treatment at a rotation number of 16,000 rpm (gravitational acceleration: 31,000 G) for 15 minutes and a centrifugal separation treatment at a rotation number of 14,000 rpm (gravitational acceleration: 24,000 G) for 15 minutes, repeatedly for each treatments. The supernatants removed in the first, second, and third centrifugal separation treatments at a rotation number of 14,000 rpm were mixed to provide a slurry of iron based oxide magnetic powder of Example 8.

The TEM observation of the slurry of the iron based oxide magnetic powder obtained in Example 8 revealed that the TEM average particle diameter was 13.5 nm, and the coefficient of variation (CV value) was 15%.

30 g of pure water was added to the resulting slurry of the iron based oxide magnetic powder of Example 8, the pH of which was controlled to 6.5 by adding a sulfuric acid aqueous solution of 1% by mass, then filtered with a membrane, recovered as a cake, and then dried, so as to provide iron based oxide magnetic powder of Example 8.

Example 9

In a 10 L reaction tank, 697.1 g of iron(III) nitrate nonahydrate having a purity of 99.3%, 233.9 g of iron(III) chloride having a purity of 99%, 181.4 g of a Ga(III) nitrate solution having a Ga concentration of 11.6% by mass, 20.3 g of cobalt(II) nitrate hexahydrate having a purity of 97%, and 21.4 g of a titanium(IV) sulfate solution having a Ti concentration of 15.1% by mass were dissolved in 4,945.8 g of pure water in the air atmosphere under a condition of 20° C. under mechanical agitation with an agitation blade. The resulting preparation solution had a molar ratio of metal ions of Fe/Ga/Co/Ti=1.71/0.200/0.045/0.045.

545.1 g of an ammonia aqueous solution of 22.3% was added at one time to the solution in the air atmosphere at 20° C. under mechanical agitation with an agitation blade, followed by continuously agitating for 2 hours (first neutralization step).

577.5 g of a citric acid solution having a citric acid concentration of 20% by mass as a hydroxycarboxylic acid was added to the solution continuously over 1 hour under a condition of 20° C. (hydroxycarboxylic.acid adding step), and then 368.0 g of an ammonia aqueous solution of 22.3% was added thereto at one time, followed by retaining for 1 hour under a condition of 20° C. under agitation, so as to form crystals of iron oxyhydroxide containing substitution elements as a precursor as an intermediate product (procedure 1, second neutralization step).

Thereafter, 1,690.5 g of tetraethoxysilane was added to the precursor slurry obtained in the procedure 1 over 35 minutes in the air atmosphere at 40° C. under agitation. The mixture was further agitated for approximately one day for coating with a hydrolyzate of the silane compound through hydrolysis. Thereafter, the resulting solution was washed and subjected to solid-liquid separation, so as to recover as a cake (procedure 2).

The precipitate (i.e., the precursor coated with gel-like $SiO_2$) obtained in the procedure 2 was dried, and the resulting dried powder was subjected to a heat treatment in a furnace in the air atmosphere at 975° C. for 4 hours, so as to provide powder of a substituted type C-iron oxide coated with the silicon oxide. The hydrolyzate of the silane compound was changed to an oxide in the heat treatment in the air atmosphere (procedure 3).

The powder of the substituted type ε-iron oxide coated with the silicon oxide obtained in the procedure 3 was agitated in a 20% by mass NaOH aqueous solution at approximately 60° C. for 24 hours to remove the silicon oxide on the surface of the particles, thereby providing a slurry containing iron based oxide particles (procedure 4).

The observation of the slurry obtained in the procedure 4 with a transmission electron microscope revealed that the TEM average particle diameter was 11.1 nm, and the coefficient of variation (CV) was 38%.

The slurry obtained in the procedure 4 was washed until the conductivity became 1 mS/m or less to provide a washed slurry of Example 9. The resulting washed slurry was controlled to have pH of 6.5 by adding a sulfuric acid aqueous solution of 1% by mass, then filtered with a membrane, recovered as a cake, and dried, so as to provide iron based oxide magnetic powder before classification. The iron based oxide magnetic powder before classification had a coercive force of 73 (kA/m), a saturation magnetization of 15.3 ($Am^2$/kg), a squareness ratio of 0.261, SFD of 6.23, a value of $I_L/I_H$ of 2.52, and a BET specific surface area of 126.1 $m^2$/g.

A 25% by mass TMAOH aqueous solution as a surface modifier was added to the washed slurry in such an amount that provided a TMAOH concentration in a surface modifier-containing slurry of 0.065 mol/kg, so as to provide a surface modifier-containing slurry.

40 g of the resulting surface modifier-containing slurry was subjected to an ultrasonic dispersion treatment with an ultrasonic cleaning machine (Bransonic Yamato 5510, produced by Yamato Scientific Co., Ltd.) for 1 hour, and then subjected to a centrifugal separation treatment with R20A2 rotor of a centrifugal separator (himac CR21GII, produced by Hitachi Koki Co., Ltd.) at a rotation number of 20,000 rpm for 15 minutes, followed by removing 30 g of the supernatant containing fine particles, so as to provide a precipitate. The gravitational acceleration in the centrifugal separation was 48,000 G. After subjecting to the ultrasonic treatment, the average secondary particle diameter of the surface modifier-containing slurry measured was 31 nm. For the resulting precipitate, the operation of the addition of the TMAOH aqueous solution, the ultrasonic dispersion, the centrifugal separation at 20,000 rpm, and the removal of the supernatant was repeated twice.

Thereafter, 30 g of a TMAOH aqueous solution of 0.065 mol/kg was added to the resulting precipitate, and the mixture was subjected to an ultrasonic dispersion treatment with an ultrasonic cleaning machine (Bransonic Yamato 5510, produced by Yamato Scientific Co., Ltd.) for 1 hour, and then subjected to a centrifugal separation treatment with R20A2 rotor of a centrifugal separator (himac CR21GII, produced by Hitachi Koki Co., Ltd.) at a rotation number of 18,000 rpm for 15 minutes, followed by removing 30 g of the supernatant containing fine particles, so as to provide a precipitate. The gravitational acceleration in the centrifugal separation was 39,000 G. For the resulting precipitate, the operation of the addition of the TMAOH aqueous solution, the ultrasonic dispersion, the centrifugal separation at 18,000 rpm, and the removal of the supernatant was further repeated twice.

The resulting precipitate was subjected to a centrifugal separation treatment at a rotation number of 16,000 rpm (gravitational acceleration: 31,000 G) for 15 minutes, a centrifugal separation treatment at a rotation number of 14,000 rpm (gravitational acceleration: 24,000 G) for 15 minutes, and a centrifugal separation treatment at a rotation number of 12,000 rpm (gravitational acceleration: 17,000 G) for 15 minutes, 3 times for each treatments. The supernatants removed in the first, second, and third centrifugal separation treatments at a rotation number of 12,000 rpm were mixed to provide a slurry of iron based oxide magnetic powder of Example 9.

The TEM observation of the resulting slurry of the iron based oxide magnetic powder revealed that the TEM average particle diameter was 15.1 nm, and the coefficient of variation (CV value) was 23%.

30 g of pure water was added to the resulting slurry of the iron based oxide magnetic powder, the pH of which was controlled to 6.5 by adding a sulfuric acid aqueous solution of 1% by mass, then filtered with a membrane, recovered as a cake, and then dried, so as to provide iron based oxide magnetic powder.

Example 10

Iron based oxide magnetic powder was obtained in the same manner as in Example 1 except that the molar ratio of metal ions in the preparation solution was changed to Fe/Ga/Co/Ti=1.505/0.375/0.070/0.050 with the same total molar amount of the metal ions as in Example 1, the amount of the supernatant removed in the centrifugal separation treatment was changed to 30 g, and the repetition number of the centrifugal separation treatment was changed to 11, and the baking temperature was changed to 981° C.

The transmission electron microscope observation of the resulting slurry obtained in the procedure 4 revealed that the TEM average particle diameter was 14.7 nm, and the coefficient of variation (CV value) was 38%.

It is found from the examples that by using the production method including adding an aqueous solution of a quaternary ammonium salt as a surface modifier to a slurry containing iron based oxide particles to provide a surface modifier-containing slurry, and subjecting the surface modifier-containing slurry to a dispersion treatment, followed by classifying, the average secondary particle diameter of the slurry after subjecting the surface modifier-containing slurry to the dispersion treatment, such as irradiation with an ultrasonic wave, can be 65 nm or less, and consequently iron based oxide magnetic powder that has a narrow particle size distribution and a narrow coercive force distribution, and is suitable for high density recording of a magnetic recording medium can be obtained.

Furthermore, it is found from Comparative Examples 1 to 5 that in the case where no surface modifier is added, and in the case where the concentration of the surface modifier is outside the scope of the production method of the invention even though the TMAOH aqueous solution is added as the surface modifier, the average secondary particle diameter of the surface modifier-containing slurry and the slurry after subjecting the slurry having controlled pH to the irradiation with an ultrasonic wave cannot be 65 nm or less, and consequently iron based oxide magnetic powder that satisfies the characteristics of the particle size distribution and the coercive force distribution targeted by the invention cannot be obtained.

TABLE 1

| | Raw material prepared molar ratio | | | | Surface modifier | | Surface modifier-containing slurry (pH) | Dispersion treatment | DLS particle diameter (nm) | Classifying step | | |
| | | | | | | | | | | Centrifugal force (G) | Time (min) | Number of prepetition |
| --- | --- | --- | --- | --- | --- | --- | --- | --- | --- | --- | --- | --- |
| | Fe | Ga | Co | Ti | Kind | Concentration (mol/kg) | | | | | | |
| Example 1 | 1.530 | 0.350 | 0.070 | 0.050 | TMAOH | 0.065 | 13 | ultrasonic | 29 | 48000 | 15 | 10 |
| Example 2 | 1.530 | 0.350 | 0.070 | 0.050 | TMAOH | 0.065 | 13 | ultrasonic | 29 | further added | | |
| Example 3 | 1.615 | 0.265 | 0.045 | 0.075 | TMAOH | 0.018 | 12 | ultrasonic | 54 | 48000 | 15 | 10 |
| Example 4 | 1.615 | 0.265 | 0.045 | 0.075 | TMAOH | 0.065 | 13 | ultrasonic | 36 | 48000 | 15 | 10 |
| Example 5 | 1.615 | 0.265 | 0.045 | 0.075 | TMAOH | 0.57 | 14 | ultrasonic | 27 | 48000 | 15 | 10 |
| Example 6 | 1.615 | 0.265 | 0.045 | 0.075 | TMAOH | 0.065 | 13 | shaker | 47 | 48000 | 15 | 10 |
| Comparative Example 1 | 1.615 | 0.265 | 0.045 | 0.075 | — | — | — | ultrasonic | 81 | 48000 | 15 | 10 |
| Comparative Example 2 | 1.615 | 0.265 | 0.045 | 0.075 | TMAOH | 0.0012 | 9 | ultrasonic | 89 | 48000 | 15 | 10 |
| Comparative Example 3 | 1.615 | 0.265 | 0.045 | 0.075 | TMAOH | 0.0036 | 10 | ultrasonic | 86 | 48000 | 15 | 10 |
| Comparative Example 4 | 1.615 | 0.265 | 0.045 | 0.075 | TMAOH | 0.0072 | 11 | ultrasonic | 79 | 48000 | 15 | 10 |

TABLE 1-continued

| | Raw material prepared molar ratio | | | | Surface modifier | | Surface modifier-containing slurry (pH) | Dispersion treatment | DLS particle diameter (nm) | Classifying step | | |
| --- | --- | --- | --- | --- | --- | --- | --- | --- | --- | --- | --- | --- |
| | Fe | Ga | Co | Ti | Kind | Concentration (mol/kg) | | | | Centrifugal force (G) | Time (min) | Number of prepetition |
| Comparative Example 5 | 1.615 | 0.265 | 0.045 | 0.075 | — | — | 11 | ultrasonic | 70 | 48000 | 15 | 10 |
| Example 7 | 2.000 | — | — | — | TMAOH | 0.065 | 13 | ultrasonic | 59 | 48000 | 15 | 10 |
| Example 8 | 2.000 | — | — | — | TMAOH | 0.065 | 13 | ultrasonic | 42 | further added | | |
| Example 9 | 1.710 | 0.200 | 0.045 | 0.045 | TMAOH | 0.065 | 13 | ultrasonic | 31 | 48000 | 15 | 10 |
| Example 10 | 1.505 | 0.375 | 0.070 | 0.050 | TMAOH | 0.065 | 13 | ultrasonic | 30 | 48000 | 15 | 11 |

TABLE 2

| | Average particle diameter (nm) | Coefficient of variation of particle diameter CV (%) | BET specific surface area (m²/g) | Composition (molar ratio) | | | | Magnetic characteristics | | | | | |
| --- | --- | --- | --- | --- | --- | --- | --- | --- | --- | --- | --- | --- | --- |
| | | | | Fe | Ga | Co | Ti | Coercive force Hc | | Saturation magnetization | Squareness ratio SQ | SFD | $I_L/I_H$ |
| | | | | | | | | (Oe) | (kA/m) | σs (Am²/kg) | | | |
| Example 1 | 18.8 | 29 | 65.9 | 1.56 | 0.35 | 0.04 | 0.05 | 2975 | 237 | 15.8 | 0.560 | 0.83 | 0.25 |
| Example 2 | 21.0 | 22 | 65.7 | 1.57 | 0.34 | 0.04 | 0.05 | 2853 | 227 | 16.2 | 0.553 | 0.77 | 0.22 |
| Example 3 | 16.8 | 29 | 77.3 | 1.65 | 0.25 | 0.03 | 0.07 | 3636 | 289 | 14.6 | 0.535 | 1.04 | 0.52 |
| Example 4 | 17.5 | 27 | 74.1 | 1.65 | 0.25 | 0.03 | 0.07 | 4130 | 329 | 14.8 | 0.582 | 0.79 | 0.28 |
| Example 5 | 18.0 | 26 | 71.7 | 1.65 | 0.25 | 0.03 | 0.07 | 4151 | 330 | 15.0 | 0.607 | 0.76 | 0.19 |
| Example 6 | 17.0 | 29 | 74.1 | 1.65 | 0.25 | 0.03 | 0.07 | 4018 | 320 | 14.9 | 0.558 | 0.84 | 0.37 |
| Comparative Example 1 | 15.4 | 37 | 85.5 | 1.65 | 0.25 | 0.03 | 0.07 | 3123 | 249 | 14.6 | 0.497 | 1.52 | 0.67 |
| Comparative Example 2 | 15.8 | 36 | 83.0 | 1.65 | 0.25 | 0.03 | 0.07 | 3218 | 256 | 14.7 | 0.503 | 1.56 | 0.73 |
| Comparative Example 3 | 15.8 | 35 | 83.1 | 1.65 | 0.25 | 0.03 | 0.07 | 3255 | 259 | 14.7 | 0.506 | 1.39 | 0.70 |
| Comparative Example 4 | 15.6 | 35 | 84.4 | 1.65 | 0.25 | 0.03 | 0.07 | 3333 | 265 | 14.7 | 0.509 | 1.29 | 0.67 |
| Comparative Example 5 | 15.6 | 36 | 84.2 | 1.65 | 0.25 | 0.03 | 0.07 | 3192 | 254 | 14.6 | 0.505 | 1.34 | 0.72 |
| Example 7 | 20.8 | 28 | 67.2 | 2.00 | — | — | — | 19560 | 1557 | 15.3 | 0.548 | 0.54 | 0.14 |
| Example 8 | 13.5 | 15 | 99.7 | 2.00 | — | — | — | 12700 | 1011 | 13.6 | 0.536 | 0.80 | 0.20 |
| Example 9 | 15.1 | 23 | 97.4 | 1.74 | 0.19 | 0.03 | 0.04 | 4798 | 382 | 13.8 | 0.582 | 1.22 | 0.50 |
| Example 10 | 19.1 | 27 | 67.8 | 1.53 | 0.37 | 0.04 | 0.05 | 2482 | 198 | 16.7 | 0.536 | 0.91 | 0.28 |

The invention claimed is:

1. Iron based oxide magnetic powder comprising particles of an ε-iron oxide having an average particle diameter measured with a transmission electron microscope of 8 nm or more and 30 nm or less and a coefficient of variation of the particle diameter of 30% or less, and having a value of $I_L/I_H$ defined below of 0.55 or less, wherein $I_H$ represents an intensity of a peak that appears on a high magnetic field side in a differential B-H curve obtained by numerical differentiation of a B-H curve obtained by measuring under conditions of an applied magnetic field of 3,979 kA/m (50 kOe), an M measurement range of 0.005 A·m² (5 emu), an applied magnetic field change rate of 13 (kA/m·s), a time constant of 0.03 sec, and a wait time of 0.8 sec, and $I_L$ represents an intensity of an intercept of the ordinate at zero magnetic field in the differential B-H curve.

2. The iron based oxide magnetic powder according to claim 1, wherein the iron based oxide magnetic powder has a squareness ratio SQ of 0.54 or more.

3. A method for producing the iron based oxide magnetic powder according to claim 1, comprising:

preparing a slurry containing particles of an ε-iron oxide or an ε-iron oxide having Fe sites, a part of which is substituted d by other metal elements, having an average particle diameter measured with a transmission electron microscope of 5 nm or more and 100 nm or less and a coefficient of variation of the particle diameter of 70% or less;

adding a quaternary ammonium salt as a surface modifier to the slurry to make a concentration of 0.009 mol/kg or more and 1.0 mol/kg or less, and simultaneously to make pH of 11 or more and 14 or less;

subjecting the surface modifier-containing slurry to a dispersion treatment to provide an ε-iron oxide-dispersed slurry or a slurry having an ε-iron oxide having Fe sites, a part of which is substituted by other metal elements, dispersed therein; and classifying the ε-iron oxide-dispersed slurry or the slurry having an ε-iron oxide having Fe sites, a part of which is substituted by other metal elements, dispersed therein.

4. The method for producing iron based oxide magnetic powder according to claim 3, wherein the quaternary ammonium salt is a tetraalkylammonium salt.

5. The method for producing iron based oxide magnetic powder according to claim 3, wherein the quaternary ammonium salt is a tetraalkylammonium hydroxide.

6. The method for producing iron based oxide magnetic powder according to claim 3, wherein in the ε-iron oxide-dispersed slurry or the slurry having an ε-iron oxide having Fe sites, a part of which is substituted by other metal elements, dispersed therein, particles of the ε-iron oxide or the ε-iron oxide having Fe sites, a part of which is substituted by other metal elements, have an average secondary particle diameter measured with a dynamic light scattering particle size measurement device of 65 nm or less.

7. The method for producing iron based oxide magnetic powder according to claim 3, wherein the slurry containing particles of the ε-iron oxide or the ε-iron oxide having Fe sites, a part of which is substituted by other metal elements, has a conductivity of 15 mS/m or less.

8. The method for producing iron based oxide magnetic powder according to claim 3, wherein the classifying step includes subjecting the ε-iron oxide-dispersed slurry or the slurry having an ε-iron oxide having Fe sites, a part of which is substituted by other metal elements, dispersed therein to a centrifugal separator, and then removing a supernatant.

9. The method for producing iron based oxide magnetic powder according to claim 8, wherein in the classifying step, the centrifugal acceleration in subjecting to the centrifugal separator is 40,000 G or more.

10. Iron based oxide magnetic powder comprising particles of an ε-iron oxide having Fe sites, a part of which is substituted by other metal elements, having an average particle diameter measured with a transmission electron microscope of 8 nm or more and 30 nm or less and a coefficient of variation of the particle diameter of 30% or less, and having a value of $I_L/I_H$ defined below of 0.55 or less, wherein $I_H$ represents an intensity of a peak that appears on a high magnetic field side in a differential B-H curve obtained by numerical differentiation of a B-H curve obtained by measuring under conditions of an applied magnetic field of 1,035 kA/m (13 kOe), an M measurement range of 0.005 A·m² (5 emu), an applied magnetic field change rate of 15 (kA/m·s), a time constant of 0.03 sec, and a wait time of 0.1 sec, and $I_L$ represents an intensity of an intercept of the ordinate at zero magnetic field in the differential B-H curve, and further wherein the iron based oxide magnetic powder has a squareness ratio of 0.54 or more.

11. The iron based oxide magnetic powder according to claim 10, wherein the metal elements substituting a part of the Fe sites are one kind or two or more kinds of Ga, Co, and Ti.

* * * * *